(12) United States Patent
Heigl et al.

(10) Patent No.: US 6,431,589 B1
(45) Date of Patent: Aug. 13, 2002

(54) GAS BAG PROTECTION DEVICE

(75) Inventors: Jürgen Heigl, Böbingen; Philipp Ritter, Wallertheim, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/665,755

(22) Filed: Sep. 20, 2000

(30) Foreign Application Priority Data

Sep. 22, 1999 (DE) .................... 299 16 700 U

(51) Int. Cl.[7] ............... B60R 21/22; B60R 21/16
(52) U.S. Cl. ................. 280/730.2; 280/743.1
(58) Field of Search ............ 280/730.2, 743.1, 280/743.2

(56) References Cited

U.S. PATENT DOCUMENTS

| | | | |
|---|---|---|---|
| 5,094,477 A | | 3/1992 | Togawa |
| 5,098,125 A | * | 3/1992 | Thornton et al. ............ 280/743 |
| 5,421,610 A | * | 6/1995 | Kavanaugh et al. ..... 280/743.1 |
| 5,511,821 A | * | 4/1996 | Meyer et al. ............. 280/743.1 |
| 5,765,867 A | * | 6/1998 | French .................... 280/743.1 |
| 5,871,231 A | * | 2/1999 | Richards et al. .......... 280/743.1 |
| 6,056,316 A | * | 5/2000 | Yamaji et al. ............ 280/730.2 |
| 6,135,492 A | * | 10/2000 | Zimmerbeutel et al. .. 280/730.2 |
| 6,135,493 A | * | 10/2000 | Jost et al. ................. 280/730.2 |
| 6,145,879 A | * | 11/2000 | Lowe et al. ............. 280/743.1 |
| 6,155,594 A | * | 12/2000 | Ibe et al. ................. 280/730.2 |
| 6,168,191 B1 | * | 1/2001 | Webber et al. ........... 280/730.2 |
| 6,170,860 B1 | * | 1/2001 | Denz et al. .............. 280/730.2 |
| 6,173,990 B1 | | 1/2001 | Nakajima et al. |
| 6,199,898 B1 | * | 3/2001 | Masuda et al. .......... 280/730.2 |

FOREIGN PATENT DOCUMENTS

| | | |
|---|---|---|
| DE | 19643435 | 5/1997 |
| DE | 19844118 | 4/1999 |

* cited by examiner

Primary Examiner—Brian L. Johnson
Assistant Examiner—Joselynn Y. Sliteris
(74) Attorney, Agent, or Firm—Tarolli, Sundheim, Covell, Tummino & Szabo L.L.P.

(57) ABSTRACT

A gas bag protection device with a gas bag to which two opposing plies of fabric are assigned. The plies of fabric consist of warp and weft threads and are sectionwise connected to each other by integral interweaving so as to form at least one inflatable chamber. The plies of fabric are integrally interwoven in a portion by at least one of the warp and weft threads in such a manner that the at least one thread forms a sacrificial thread which bursts in a restraint situation.

16 Claims, 2 Drawing Sheets

GAS BAG PROTECTION DEVICE

TECHNICAL FIELD

The invention relates to a gas bag protection device with gas bag to which two opposing plies of fabric are assigned, which are sectionwise connected to each other by integral interweaving.

BACKGROUND OF THE INVENTION

Especially large-area side gas bags, so-called window bags, have two plies of fabric which form the outer walls of the gas bag and are connected to each other at the rim and in the region of partition walls between neighboring chambers by integral weaving. The loading of the threads in the durably woven section, for example in the region of the rim, is very high just when the first pressure shock occurs on inflation. In the case of window bags it is always attempted to optimize gas guidance for rapid inflation and to adapt the hardness of the gas bag to the ambient conditions.

BRIEF SUMMARY OF THE INVENTION

The invention provides a gas bag protection device with gas bag making it possible by simple and cost-effective means to quickly and simply adapt the gas bag geometry, the flow conditions within the gas bag and to reduce thread loading in the durably woven sections without involving additional steps in fabrication. This is achieved in a gas bag protection device with gas bag to which two opposing plies of fabric are assigned. The plies of fabric consist of warp and weft threads and are sectionwise connected to each other by integral interweaving so as to form at least one inflatable chamber. The plies of fabric are integrally interwoven in a portion by at least one of the warp and weft threads in such a manner that the at least one thread forms a sacrificial thread which bursts in a restraint situation. In gas bags known hitherto, use is made of so-called burst seams designed to intentionally burst on inflation or deployment of the gas bag. These burst seams are formed, for example, of a less tough thread, it being very difficult, however, to reliably reproduce or predict the load at which the thread bursts. On top of this, separate steps in fabrication were needed, for example, additional stitching. In the gas bag protection device in accordance with the invention, by contrast, it is possible to join the plies of fabric to each other by one or more sacrificial threads in small punctiform or, for example, also linear areas by simple and cost-effective integral weaving. The sacrificial threads are destroyed by the increase in pressure within the gas bag by it being inflated or by the occupant diving into the gas bag.

Integral weaving is done in the so-called Jacquard weaving technique.

In accordance with the preferred embodiment the gas bag comprises two opposing plies of fabric connected to each other at the rim of the gas bag, preferably by integral weaving. The plies of fabric delimit at least one chamber which can be filled with gas, they being integrally interwoven sectionwise, for example, as mentioned, to form the rim or to form partition walls. By means of the sacrificial thread the plies of fabric are connected to each other in the region of an inflatable chamber, i.e. within the gas bag.

The destructible portion thus formed may be made use of for various purposes and accordingly can be arranged at differing locations.

A first possibility provides that a chamber is separated by the sacrificial thread, which chamber, in terms of flow, is to be filled later than a neighboring chamber. The sacrificial thread separates the two chambers from each other; however, as soon as the pressure in the first-filled chamber is sufficiently high, the sacrificial thread bursts and the gas is able to flow over into the neighboring chamber. Such an overflow may occur in any case or, for example, not before a gas bag pressure is attained which can only be produced by the impact of the occupant. In this case an outflow opening may also be provided in the chamber to be filled later permitting the gas to escape to the environment. This is important especially in the case of side gas bags which need to be gas-tight and for this purpose are coated with a film so that the gas bags are not too hard.

Another possibility of making use of the sacrificial threads consists of providing them to damp the first pressure shock which acts on the durably woven sections where it results in extreme loading of the threads. When the sacrificial threads are located at a predetermined distance upstream of a durably woven section this abrupt loading of the fabric in this section is significantly diminished.

A third possibility of making use of sacrificial threads is to employ them for guiding the gas flow. Thus, the sacrificial threads may run linearly, for example, and guide the gas on commencement of inflation into a chamber or within a chamber into specific portions, thus enabling deployment and inflation to be optimized by simple means.

A fourth possibility of making use of sacrificial threads consists of, for example, employing them to close off not the gas bag itself, but a ply of fabric, serving as the cover of the gas bag and enveloping the gas bag in the folded condition and maintaining it in this condition. Thus, it is provided an envelope which may be used as a transport envelope or a built-in-envelope.

DETAILED DESCRIPTION OF THE PREFERRED EMBODIMENTS

Figure 1:
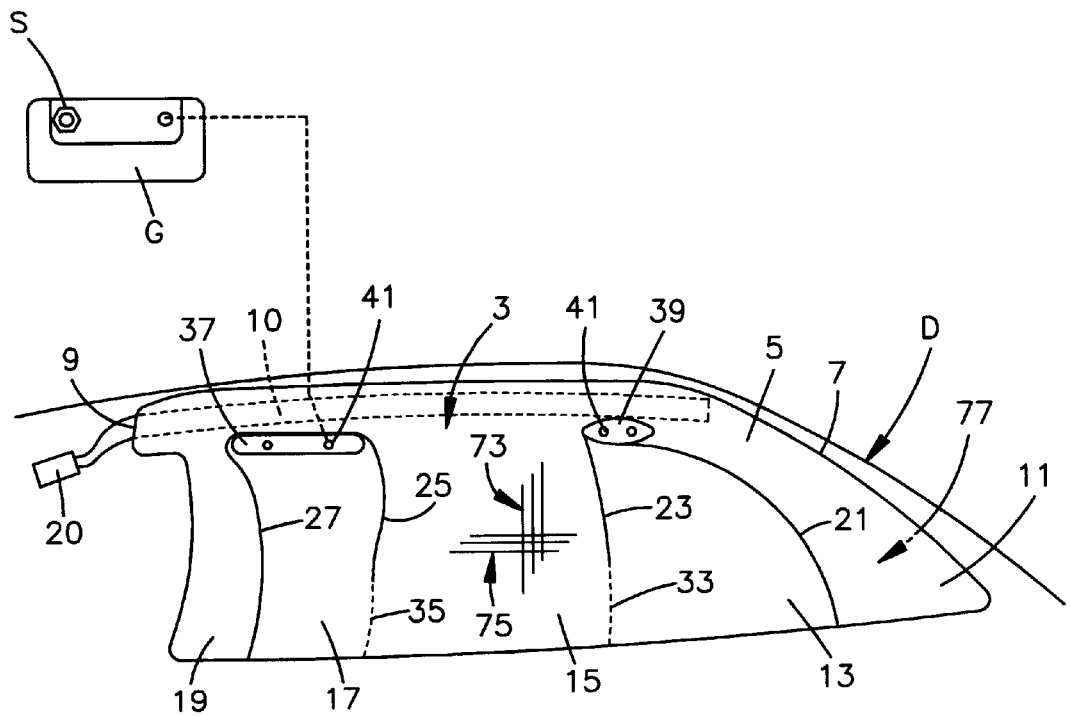
FIG. 1 is a side view of a first embodiment of the gas bag protection device in accordance with the invention in the form of a large-area ABC gas bag.

Referring now to FIG. 1 there is illustrated a gas bag protection device with a large-area ABC gas bag 3 in the inflated condition which in a collision totally covers the side windows on one side of vehicle and provides head protection for the front and rear seat occupants. The roof frame of the vehicle is identified by D. The gas bag 3 consists of two opposing plies of fabric which are identified by 5 and 77, the visible front ply of fabric 5 covering the ply of fabric 77 located behind it. The two plies of fabric are integrally interwoven along the rim 7 in making use of the Jacquard weaving technique. The plies of fabric each consist of warp and weft threads 73 and 75, respectively; the orientation of these threads in the longitudinal and vertical direction of the gas bag body merely has exemplary character and is not meant to be limited to the one shown. Via an opening 9 at the upper edge of the gas bag 3, a gas lance 10 is inserted, the latter being merely indicated by broken lines since it is not a component of the gas bag. Via the gas lance 10, gas of an inflator 20 is introduced into the gas bag in the region of the full upper edge thereof. The gas bag 3 has several chambers 11, 13, 15, 17, 19 which are filled with gas. The chambers are separated from each other by partition walls 21, 23, 25, 27. The partition walls 21, 23, 25, 27 do not represent separate parts, they instead also being formed by integrally weaving the plies of fabric.

The partition walls 23 and 25 do not extend down to the lower edge of the inflation gas bag 3, they instead ending spaced away therefrom. Each of them is, however, continued by a linear, destructible portion 33 and 35 respectively, indicated by broken lines and extending down to the lower edge. These destructible portions 33, 35 form a kind of destructible partition wall. Due to the partition walls 21, 23, 25, 27 in conjunction with the destructible portions 33 and 35 the chambers 13, 17 are separated in terms of flow from the chambers surrounding them. They also have no direct flow connection with the gas lance 10 and thus form chambers which are filled later than the chambers 11, 15 and 19.

Directly adjoining the gas lance 10 there are provided tow durable sections 37 and 39 having integral weaving which surrounds through holes 41 serving to lead through fastening screws S for securing grab handles G fastened to the roof frame D, these fastening screws likewise clamping the gas bag to the roof frame. FIG. 1 shows such a grab handle in a slightly enlarged view.

The destructible portions 33, 35 are formed by the two plies of fabric being integrally interwoven in this portion only by very few warp and/or weft threads, i.e. only as few threads for integrally weaving being used as needed to not withstand the load on inflation of the gas bag ba the inflator 20 and thus burst, thus forming sacrificial threads. This will be detailed later with reference to FIGS. 4 and 5.

On inflation of the gas bag, gas flows via the gas lance 10 into the interior of the gas bag 3 and directly into the chambers 11, 15 and 19. The gas bag will deploy downwards and the chambers 11, 15 and 19 are packed tight with gas. In the final phase of inflation when the gas bag has completed deployment downwards, the pressure in the interior of the gas bag becomes so high that the so-called sacrificial threads in the destructible portions 33, 35 burst which is achieved by an appropriate coordination of the gas bag and the inflator. Gas then flows via the chamber 15 into the chambers 13 and 17 which are filled staggered in time.

The destructible portions 33, 35 may also be designed so as to have such a stability that their sacrificial threads are not destroyed until the maximum pressure is attained in the interior of the gas bag. This maximum pressure does not occur when the gas bag is being filled, for instance, but only when the occupant dives into the gas bag. This has the advantage that the gas bag is previously inflated to tautness and becomes soft on impact of the occupant and dissipates energy so that the load on the occupant is reduced.

Figure 2:
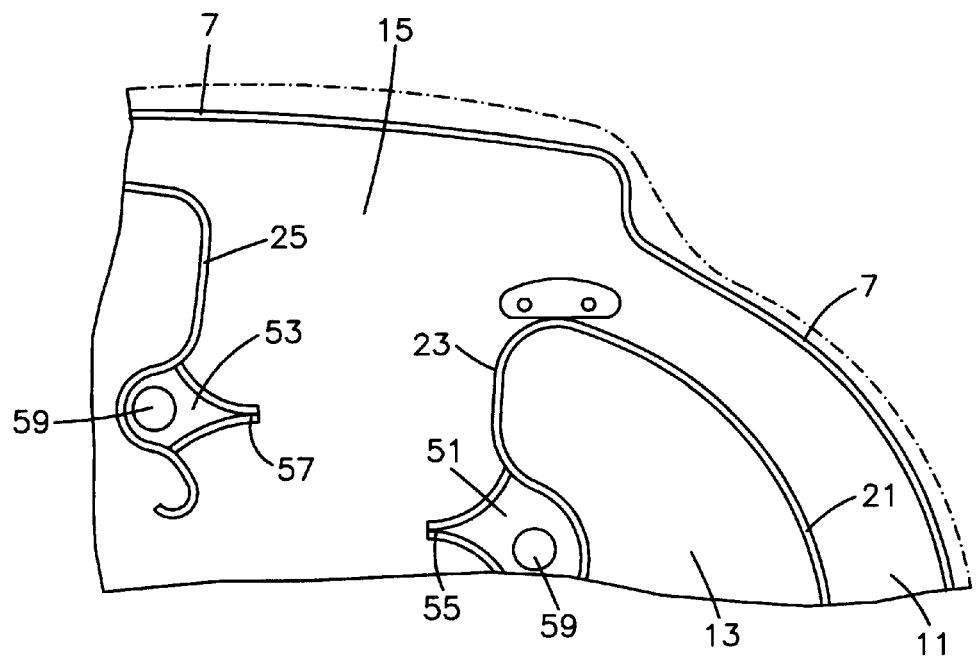
FIG. 2 is a side view of a front section of an inflated ABC gas bag in accordance with a second embodiment of the gas bag protection device.

Referring now to FIG. 2 there is illustrated an embodiment in which portions and parts like those as shown in FIG. 1 are identified by like reference numerals. In this embodiment a further two small chambers 51, 53 are separated from the chamber 15 by linear and destructible portions 55, 57. In a ply of fabric in the chambers 51, 53 outflow openings 59 are provided. The chambers 51, 53 are not opened until the head of the occupant dives into the side gas bag and the internal pressure is sufficiently high, gas then flowing into the chambers 51, 53 and via the ports 59 to the environment, resulting in the gas bag becoming softer. It is particularly in the case of large-area head/side gas bag systems that there is, on the one hand, the requirement to maintain them inflated as long as possible so that they still offer protection should the vehicle topple and, on the other, the gas bag should not be too hard which is actually only possible when gas is able to exit. Due to the optionally opened outflow openings 59 a prolonged service life of the gas bag exists and it does not become soft until actually impacted by the occupant. Preferably the gas bag is coated with a film on both outer faces of the plies of fabric to make it gas-tight.

Figure 3:
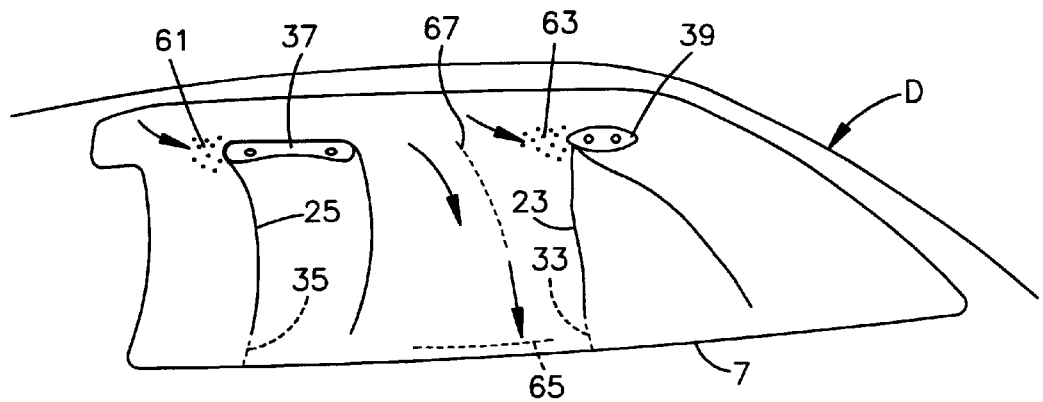
FIG. 3 is a side view of an inflated ABC gas bag in accordance with a third embodiment of the gas bag protection device.

Referring now to FIG. 3 there is illustrated how the sacrificial threads may also be arranged directly upstream of a durably woven section, such as the section 37, 39 or the rim to reduce the high loads resulting from the impact of the first pressure shock or the deployment in the threads of the durably woven section. The destructible portions thus act as a damper during inflation and deployment. Punctiform destructible portions 61, 63 are arranged to the side of the durably woven sections 37, 39, i.e. upstream in the main direction of flow (indicated by the arrows) of the gas emerging from the gas lance which would otherwise directly impact the durably woven sections 37, 39. In addition, for example, a linear woven portion 65 composed of punctiform woven sections may also be provided slightly spaced away from the durably woven rim 7 which likewise reduces shock loading of the threads in the rim 7 upon the gas bag being fully deployed and inflated. Furthermore, linear destructible portions 67 may also be produced, for example, by means of sacrificial threads extending from the chamber entry up into the chamber (see FIG. 3) and exclusively serve to deflect the gas flow and which are destroyed by the first pressure shock.

Figure 4:
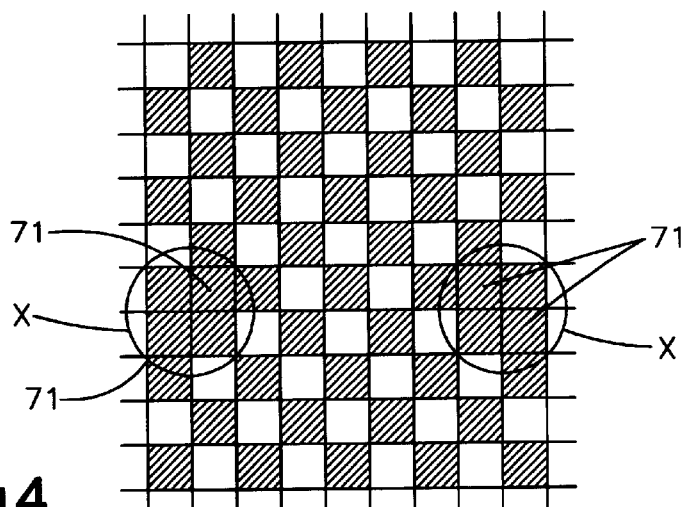
FIG. 4 is a magnified view of a woven portion including punctiform-acting sacrificial threads.
Figure 5:
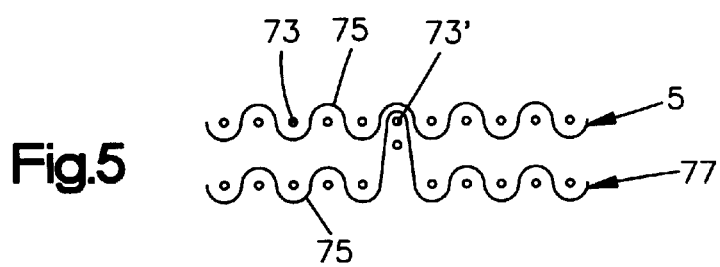
FIG. 5 is a magnified cross-section through a portion woven by an sacrificial thread.

Referring now to FIGS. 4 and 5 there is illustrated in more detail how the destructible portions are produced. FIG. 4 is a sketch illustrating the weave of the plies of fabric employed, the so-called weave design. In the portions identified X it is evident that the regular weave is interrupted by the two plies of fabric being connected to each other punctiform by sacrificial threads. The portions representing so to speak a punctiform connection are identified by the reference numeral 71.

Referring now to FIG. 5, there is illustrated the specific connection in more detail, 73 identifying a warp thread and 75 a weft thread. The two plies of fabric are identified by the reference numeral 5 and 77, respectively. The plies of fabric 5 and 77 are joined to each other by a weft thread running into the ply of fabric 5 and surrounding a warp thread 73' before then finally going back into the ply of fabric 77. It is in this portion that a destructible connection is achieved and the weft thread 75 forms a sacrificial thread, although warp threads could serve the connection just as well, the section through the corresponding plies of fabric then being identical to the section as shown in FIG. 5. In addition to this, of course, warp and weft threads going into the opposing ply of fabric in forming a sacrificial thread may supplement each other in forming a destructible portion.

Figure 6:
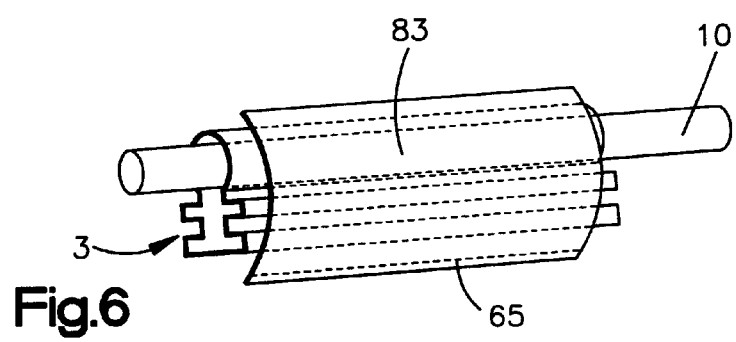
FIG. 6 is a detail of a folded ABC gas bag surrounded by a fabric as an envelope.

Referring now to FIG. 6 there is illustrated an embodiment in which the gas lance 10 is surrounded by a section of the folded gas bag 3. Only a detail of the whole folded ABC gas bag as shown in FIG. 1 is evident.

Gas bag 3 and gas lance 10 are surrounded by a ply of fabric 83 assigned to the gas bag 3, this ply being folded to thus actually form two plies of fabric. These are likewise integrally interwoven at their lower free edge via a sacrificial thread so that a linear portion 65 materializes which closes the cover formed by the ply of fabric 83. On deployment of the gas bag 3 the sacrificial thread is then destroyed thereby.

Due to the number and density (number relative to the surface area) of the punctiform connections 71 by the sacrificial threads the force needed to destroy the portions formed thereby can be predetermined and set very precisely.

In addition to this, chambering, i.e. the formation of an undesirable fold difficult to release and preventing an overflow can now be avoided in deployment of the gas bag in accordance with the invention.

What is claimed is:

1. A gas bag protection device with gas bag to which two opposing plies of fabric are assigned, which consist of warp and weft threads and are section-wise connected to each other by integral interweaving so as to form at least one inflatable chamber, said plies of fabric being integrally interwoven in a destructible portion by at least one of said warp and weft threads in such a manner that said at least one thread forms a sacrificial thread which bursts in a restraint situation, at least one of said inflatable chambers being designed as a large-volume chamber and said destructible portion forming a gas deflection within said large-volume chamber.

2. The gas bag protection device according to claim 1, wherein the destructible portion extends linearly.

3. The gas bag protection device as set forth in claim 1, wherein a durably woven portion is provided and wherein said destructible portion is arranged such that it prevents the direct flow against said durably woven portion when said gas bag is filled.

4. The gas bag protection device as set forth in claim 1, wherein said gas bag is a large-area side gas bag.

5. The gas bag protection device as set forth in claim 1, wherein a ply of fabric is provided which forms a cover for said gas bag in a folded condition, said ply of fabric being closed by a portion destructible on deployment of said gas bag.

6. The gas bag protection device as set forth in claim 1, wherein two chambers arranged adjacent to each other have a partition wall between them and wherein a destructible portion extends slightly spaced away from and substantially parallel to at least one of a rim of said gas bag and said partition wall.

7. The gas bag protection device as set forth in claim 1, wherein a roof frame is provided and grab handles to be secured thereto by means of fastening screws, said gas bag being a head/side gas bag having through holes for leading through of said fastening screws of said grab handles, said through holes being surrounded by a durably integrally woven section, and wherein a destructible portion formed by a sacrificial thread is disposed to a side of said durably woven, section surrounding said through holes.

8. The gas bag protection device as set forth in claim 1, wherein said gas bag comprises a rim, said two opposing plies of fabric being connected to each other at said rim of said gas bag and defining at least one chamber which can be filled with gas, said two plies of fabric being integrally interwoven section-wise, and wherein at least one sacrificial thread is provided, connecting to each other said plies of fabric in said portion of said at least one inflatable chamber.

9. The gas bag protection device as set forth in claim 1, wherein a durably woven section is provided and said sacrificial thread defines a destructible portion upstream of said durably woven section and spaced away therefrom.

10. A gas bag protection device with gas bag to which two opposing plies of fabric are assigned, which consist of warp and weft threads and are section-wise connected to each other by integral interweaving so as to form at least one inflatable chamber, said plies of fabric being integrally interwoven in a destructible portion by at least one of said warp and weft threads in such a manner that said at least one thread forms a sacrificial thread which bursts-in a restraint situation, at least one of said inflatable chambers being designed as a large-volume chamber and said destructible portion forming a gas deflection at an entry to said large-volume chamber.

11. The gas bag protection device according to claim 10, wherein said destructible portion extends linearly.

12. The gas bag protection device as set forth in claim 10, wherein a durably woven section is provided and wherein said destructible portion is arranged such that it prevents a direct flow against said durably woven section when said gas bag is filled.

13. The gas bag protection device as set forth in claim 10, wherein said gas bag is a large-area side gas bag.

14. The gas bag protection device as set forth in claim 10, wherein a roof frame is provided and grab handles to be secured thereto by means of fastening screws, said gas bag being a head/side gas bag having through holes for leading through of said fastening screws of said grab handles, said through holes being surrounded by a durably integrally woven section, and wherein a destructible portion formed by a sacrificial thread is disposed to a side of said durably woven section surrounding said through holes.

15. The gas bag protection device as set forth in claim 10, wherein two chambers arranged adjacent to each other have a partition wall between them and wherein a destructible portion extends slightly spaced away from and substantially parallel to at least one of a rim of said gas bag and said partition wall.

16. The gas bag protection device as set forth in claim 10, wherein a ply of fabric is provided which forms a cover for said gas bag in a folded condition, said ply of fabric being closed by a portion destructible on deployment of said gas bag.

* * * * *